United States Patent
Saijo et al.

(10) Patent No.: US 12,387,446 B2
(45) Date of Patent: Aug. 12, 2025

(54) INFORMATION PROCESSING APPARATUS, INFORMATION PROCESSING METHOD, AND PROGRAM FOR PLACING AN AGENT IN A VIRTUAL SPACE

(71) Applicant: Nippon Telegraph and Telephone Corporation, Tokyo (JP)

(72) Inventors: Ryohei Saijo, Musashino (JP); Masahiro Watanabe, Musashino (JP); Tae Sato, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 342 days.

(21) Appl. No.: 18/010,975

(22) PCT Filed: Jun. 17, 2020

(86) PCT No.: PCT/JP2020/023792
§ 371 (c)(1),
(2) Date: Dec. 16, 2022

(87) PCT Pub. No.: WO2021/255864
PCT Pub. Date: Dec. 23, 2021

(65) Prior Publication Data
US 2023/0237751 A1  Jul. 27, 2023

(51) Int. Cl.
*G06T 7/70* (2017.01)
*G06F 3/01* (2006.01)
(Continued)

(52) U.S. Cl.
CPC .............. *G06T 19/20* (2013.01); *G06F 3/013* (2013.01); *G06T 7/70* (2017.01); *G06T 13/40* (2013.01);
(Continued)

(58) Field of Classification Search
None
See application file for complete search history.

(56) References Cited

U.S. PATENT DOCUMENTS 7,394,459 B2 * 7/2008 Bathiche .................. A63F 13/00
  715/702
9,646,417 B1 * 5/2017 Sowadski ............. G06T 19/006
(Continued)

FOREIGN PATENT DOCUMENTS

JP  2020514848  5/2020

OTHER PUBLICATIONS

Tanaka et al., "Acceptable Dialogue Start Supporting Agent for Multi-Tasking Online Communication," 24th Fuzzy System Symposium, Sep. 3, 2008, pp. 586-589, 9 pages (with English translation).

*Primary Examiner* — Joni Hsu
(74) *Attorney, Agent, or Firm* — Fish & Richardson P.C.

(57) ABSTRACT

In accordance with an aspect of the present invention, an information processing apparatus includes an interface that transmits or receives data to or from an input apparatus that inputs user position information indicating a position of a user, and a processor that calculates an evaluation value for an evaluation target position based on the user position information, determines a position in a virtual space or a real space where an agent supporting the user is placed based on the evaluation value, and places the agent at the determined position in the virtual space or real space.

7 Claims, 13 Drawing Sheets

(51) Int. Cl.
*G06T 13/40* (2011.01)
*G06T 15/20* (2011.01)
*G06T 19/00* (2011.01)
*G06T 19/20* (2011.01)
*G06V 10/74* (2022.01)

(52) U.S. Cl.
CPC ............ *G06T 15/20* (2013.01); *G06T 19/006* (2013.01); *G06V 10/761* (2022.01); *G06T 2207/30242* (2013.01); *G06T 2219/2004* (2013.01)

(56) References Cited

U.S. PATENT DOCUMENTS

| | | | |
|---|---|---|---|
| 10,955,665 B2* | 3/2021 | Salter | G06F 3/011 |
| 2019/0026936 A1* | 1/2019 | Gorur Sheshagiri | G06F 3/0304 |
| 2021/0287440 A1 | 9/2021 | Wang et al. | |

* cited by examiner

INFORMATION PROCESSING APPARATUS, INFORMATION PROCESSING METHOD, AND PROGRAM FOR PLACING AN AGENT IN A VIRTUAL SPACE

CROSS-REFERENCE TO RELATED APPLICATIONS

This application is a National Stage application under 35 U.S.C. § 371 of International Application No. PCT/JP2020/023792, having an International Filing Date of Jun. 17, 2020, the disclosure of which is considered part of the disclosure of this application, and is incorporated by reference in its entirety into this application.

TECHNICAL FIELD

An aspect of the present invention relates to an information processing apparatus, an information processing method, and a program for placing an agent that supports a user, for example.

BACKGROUND ART

In recent years, a system for placing an agent for supporting a user in a virtual space or the like has been provided. For example, such a system displays the agent on a screen that the user visually recognizes. The system provides predetermined support to the user through an operation of the agent or the like.

CITATION LIST

Non Patent Literature

NPL 1: Takahiro Tanaka et al., Acceptable Dialogue Start Supporting Agent for Multi-Tasking Online Communication, 24th Fuzzy System Symposium, DT2-3, pp. 586-589, 2008

SUMMARY OF THE INVENTION

Technical Problem

It is preferable for an agent to be placed at a position that is easily recognized by a user and does not block the user from seeing what the user wants to watch. Thus, a technology for placing an agent at an appropriate position in a field of view of a user is provided.

Means for Solving the Problem

In accordance with an aspect of the present invention, an information processing apparatus includes: an interface configured to transmit or receive data to or from an input apparatus configured to input user position information indicating a position of a user; and a processor configured to calculate an evaluation value for an evaluation target position based on the user position information, determine a position in a virtual space or a real space where an agent supporting the user is placed, based on the evaluation value, and place the agent at the determined position in the virtual space or real space.

Effects of the Invention

In accordance with an embodiment, the agent system can place the agent at a position that is easily recognized by the user and does not block the user from seeing what the user wants to watch.

DETAILED DESCRIPTION OF THE INVENTION

Hereinafter, embodiments according to the present invention will be described with reference to the drawings.

First Embodiment

First, a first embodiment will be described.

An agent system according to the embodiment places an agent in a virtual space by using a technology such as virtual reality (VR), augmented reality (AR), or mixed reality (MR). The agent system supports a user who is a support target, through an agent. Here, the agent system presents to the user that another user has an intention of starting communication by changing a direction of the agent. Content of the support that the agent system performs is not limited to a specific configuration.

Figure 1:
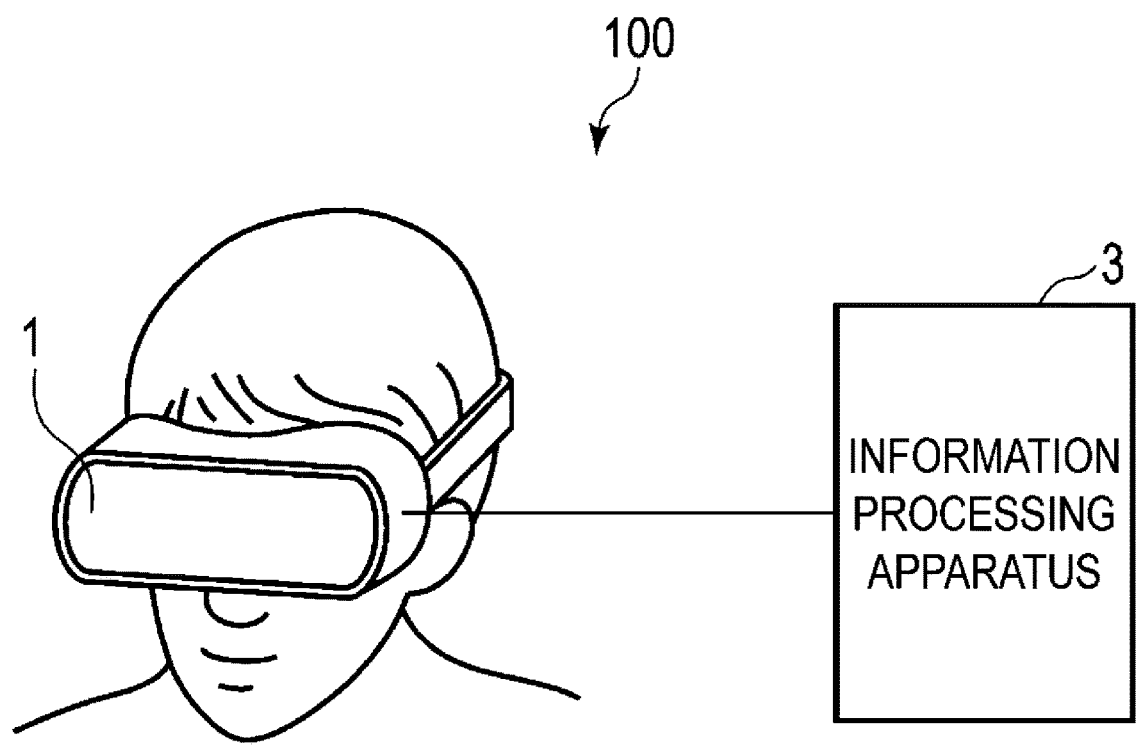
FIG. 1 is a diagram illustrating a configuration example of an agent system according to a first embodiment.

FIG. 1 illustrates a configuration example of an agent system 100 according to the embodiment. As illustrated in FIG. 1, the agent system 100 includes a headset 1, an information processing apparatus 3, and the like. The headset 1 and the information processing apparatus 3 are connected to each other and can communicate with each other.

The headset 1 is a goggle type headset. The headset 1 has a structure that can be attached to and detached from a head of the user. The headset 1 displays an image to the user under the control of the information processing apparatus 3. Further, the headset 1 measures a position, angle, acceleration, and the like of the head of the user.

The headset 1 may be a glasses-type headset.

The information processing apparatus 3 sets a virtual space. The information processing apparatus 3 generates an image visually recognized by an avatar of the user at a predetermined position in the virtual space and displays the image on the headset 1.

Figure 2:
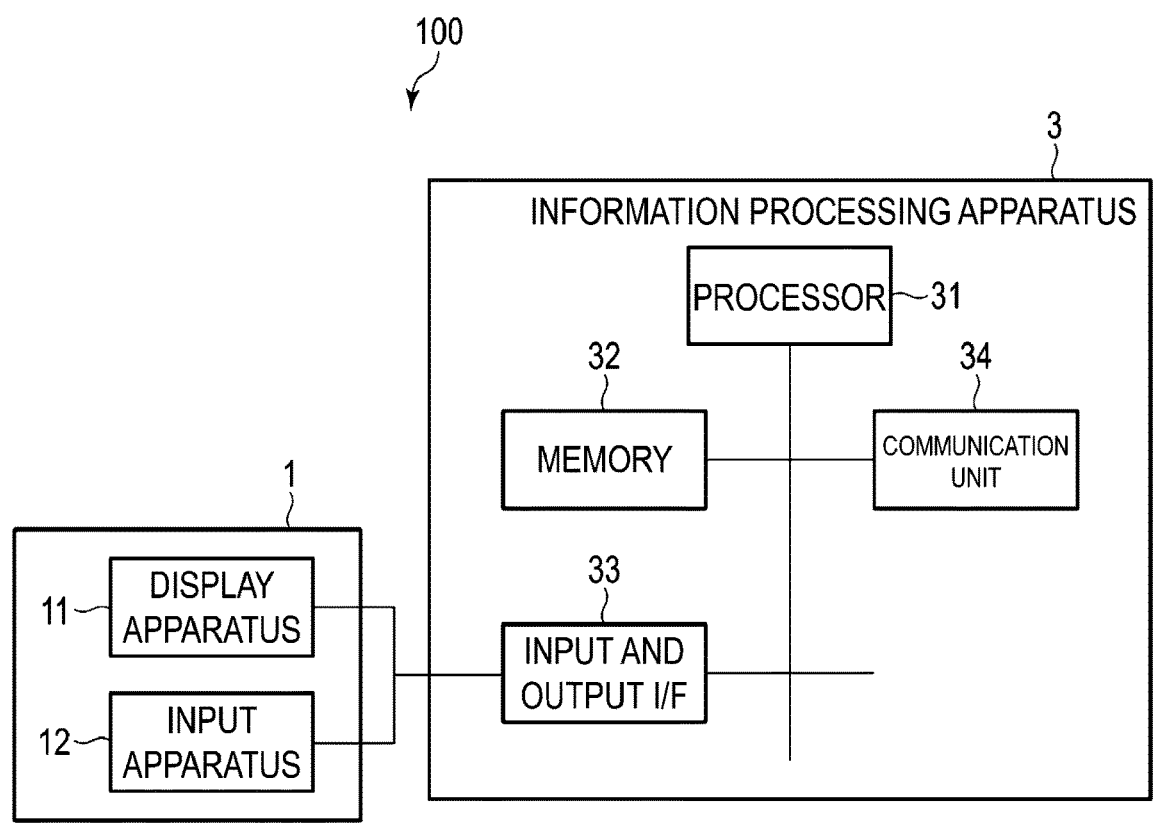
FIG. 2 is a block diagram illustrating a configuration example of the agent system according to the first embodiment.

FIG. 2 is a block diagram illustrating a configuration example of the agent system 100. As illustrated in FIG. 2, the headset 1 includes a display apparatus 11 and an input apparatus 12. The display apparatus 11 and the input apparatus 12 are connected to the information processing apparatus 3.

The display apparatus 11 displays an image to the user under the control of the information processing apparatus 3. Here, the display apparatus 11 is a head-mounted display mounted on the head of the user. Further, the display apparatus 11 may display different images to left and right eyes of the user to realize stereoscopic viewing.

For example, the display apparatus 11 includes a display panel configured of an organic electroluminescence (EL) display, and has a display area corresponding to a visual field range of the user.

The input apparatus 12 inputs posture information indicating a posture of the user and user position information indicating a position of the user to the information processing apparatus 3. The posture information and the user position information are used for the information processing apparatus 3 to specify a field of view of the avatar of the user in the virtual space. Here, the input apparatus 12 inputs posture information indicating, for example, an operation of the head of the user wearing the headset 1 as the posture of the user to the information processing apparatus 3. For example, the input apparatus 12 includes a sensor that measures an angle of the headset 1, an acceleration applied to the headset 1, and the like. The input apparatus 12 inputs a sensor signal from the sensor to the information processing apparatus 3 as the posture information. The input apparatus 12 may input an operation signal from a controller to the information processing apparatus 3 as the posture information.

Further, the user position information indicates the position of the user in the virtual space. The input apparatus 12 may acquire the user position information through a sensor. Further, the input apparatus 12 may acquire the user position information through the controller. Further, the user position information may indicate a movement amount and a movement direction of the user.

Further, as illustrated in FIG. 2, the information processing apparatus 3 includes, for example, a processor 31, a memory 32, an input and output interface 33, and a communication unit 34.

The processor 31, the memory 32, the input and output interface 33, and the communication unit 34 are connected to each other via a data bus or the like.

The processor 31 has a function of controlling an operation of the entire information processing apparatus 3. The processor 31 may include, for example, an internal cache and various interfaces. The processor 31 realizes various processing by executing a program stored in advance in the internal memory, the memory 32, or the like.

For example, the processor 31 includes a CPU and the like. Further, the processor 31 may be configured of an application specific integrated circuit (ASIC) or the like. Further, the processor 31 may be configured of a field programmable gate array (FPGA) or the like.

The memory 32 stores various types of data. For example, the memory 32 functions as a ROM, a RAM, and an NVM.

For example, the memory 32 stores a control program, control data, and the like. The control program and the control data are incorporated in advance according to a specification of the information processing apparatus 3. For example, the control program is, for example, a program that supports functions realized by the information processing apparatus 3.

Further, the memory 32 temporarily stores data or the like that is being processed by the processor 31. Further, the memory 32 may store data necessary for execution of an application program, an execution result of the application program, and the like.

The input and output interface 33 is an interface for transmitting or receiving data to or from the headset 1 wirelessly or by wire. That is, the input and output interface 33 communicates with the display apparatus 11 and the input apparatus 12 of the headset 1.

For example, the input and output interface 33 is an interface that supports a universal serial bus (USB) connection, a Bluetooth (registered trademark) connection, or the like.

Further, the input and output interface 33 may include an interface for transmitting or receiving data to or from the display apparatus 11, and an interface for transmitting or receiving data to or from the input apparatus 12.

The communication unit 34 is an interface for connection to an external apparatus. For example, the communication unit 34 connects to the external apparatus through an external network. For example, the communication unit 34 is an interface that supports a wired or wireless local area network (LAN) connection.

For example, the information processing apparatus 3 is a computer such as a desktop PC or a laptop PC.

The agent system 100 may include a configuration as required, in addition to the configuration as illustrated in FIGS. 1 and 2, or have a configuration in which a specific configuration is excluded from the information processing apparatus 3.

Further, the headset 1 and the information processing apparatus 3 may be integrally formed. Further, each of the headset 1 and the information processing apparatus 3 may include a plurality of apparatuses.

Next, functions that are realized by the information processing apparatus 3 will be described. The functions realized by the information processing apparatus 3 are realized by the processor 31 executing a program stored in the internal memory, the memory 32, or the like.

Figure 3:
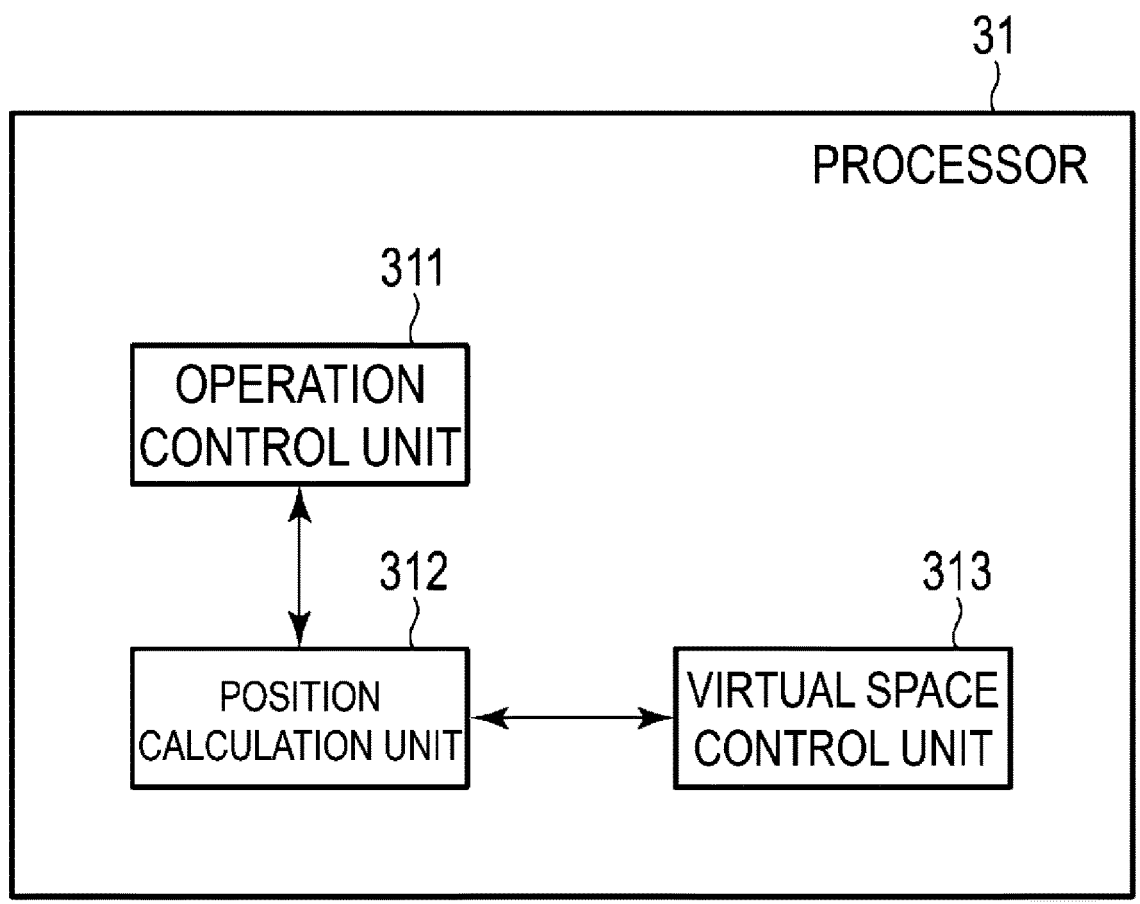
FIG. 3 is a functional block diagram of the processor according to the first embodiment.

FIG. 3 illustrates the functions that are realized by the processor 31. As illustrated in FIG. 3, the processor 31 realizes an operation control unit 311, a position calculation unit 312, a virtual space control unit 313, and the like.

The virtual space control unit 313 sets the virtual space. The virtual space control unit 313 controls a size and shape of the virtual space. Further, the virtual space control unit 313 places the avatar of the user, the agent, or other object in the virtual space. The virtual space control unit 313 may place objects under the control of an external apparatus that communicates through the communication unit 34.

Further, the virtual space control unit 313 generates a field of view (an image seen from a viewpoint of the user) of the user (the avatar of the user) in the virtual space. The virtual space control unit 313 generates a vector indicating a line of sight of the user based on the posture information from the input apparatus 12. The virtual space control unit 313 causes the display apparatus 11 to display an image of the field of view of the user based on the vector, the user position information, and the like.

Further, the operation control unit 311 controls an operation of the agent in the virtual space. Here, the operation control unit 311 causes the agent to perform an operation of supporting the user.

Figure 4:
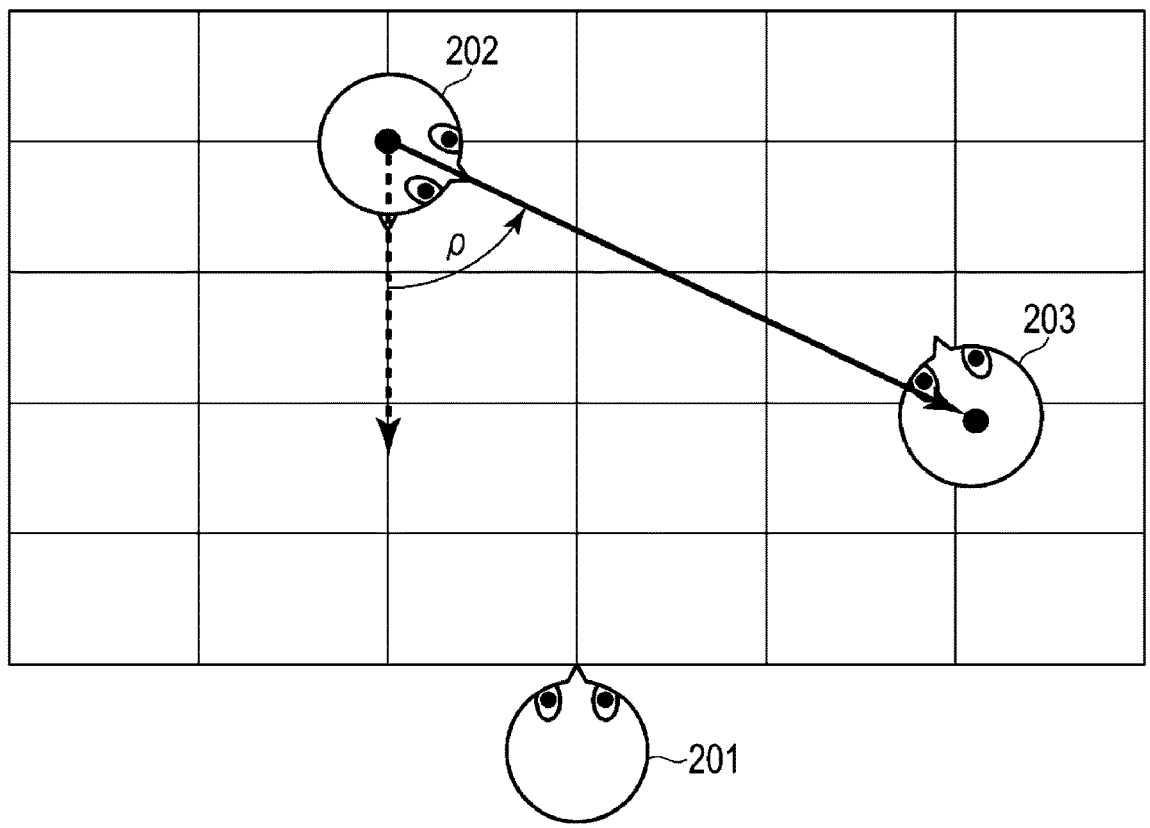
FIG. 4 is a diagram illustrating an operation example of the agent system according to the first embodiment.

FIG. 4 illustrates the operation of the agent in the virtual space. In an example illustrated in FIG. 4, an avatar 201, an agent 202, and a speaker 203 are placed in the virtual space.

The avatar 201 is an avatar that is operated by the user of the agent system 100. The virtual space control unit 313 causes the display apparatus 11 to display a field of view of the avatar 201.

The speaker 203 is one of objects placed in the virtual space. The speaker 203 performs communication with the avatar 201. The speaker 203 may be an object operated by a program or an avatar operated by another user.

The agent 202 is an agent that supports the avatar 201 (that is, the user). The agent 202 is one of the objects placed in the virtual space.

The agent 202 informs the avatar 201 that the speaker 203 has an intention of starting communication with the avatar 201, by a direction of the agent 202. Here, the operation control unit 311 calculates an angle p formed by a vector indicating a current direction of the agent 202 and a vector connecting the agent 202 to the speaker 203. When the angle p is calculated, the operation control unit 311 changes a direction of the agent 202 by the angle p. That is, the operation control unit 311 rotates the agent 202 to be directed to the speaker 203.

The position calculation unit 312 determines a position of the agent 202 in the virtual space.

Figure 5:
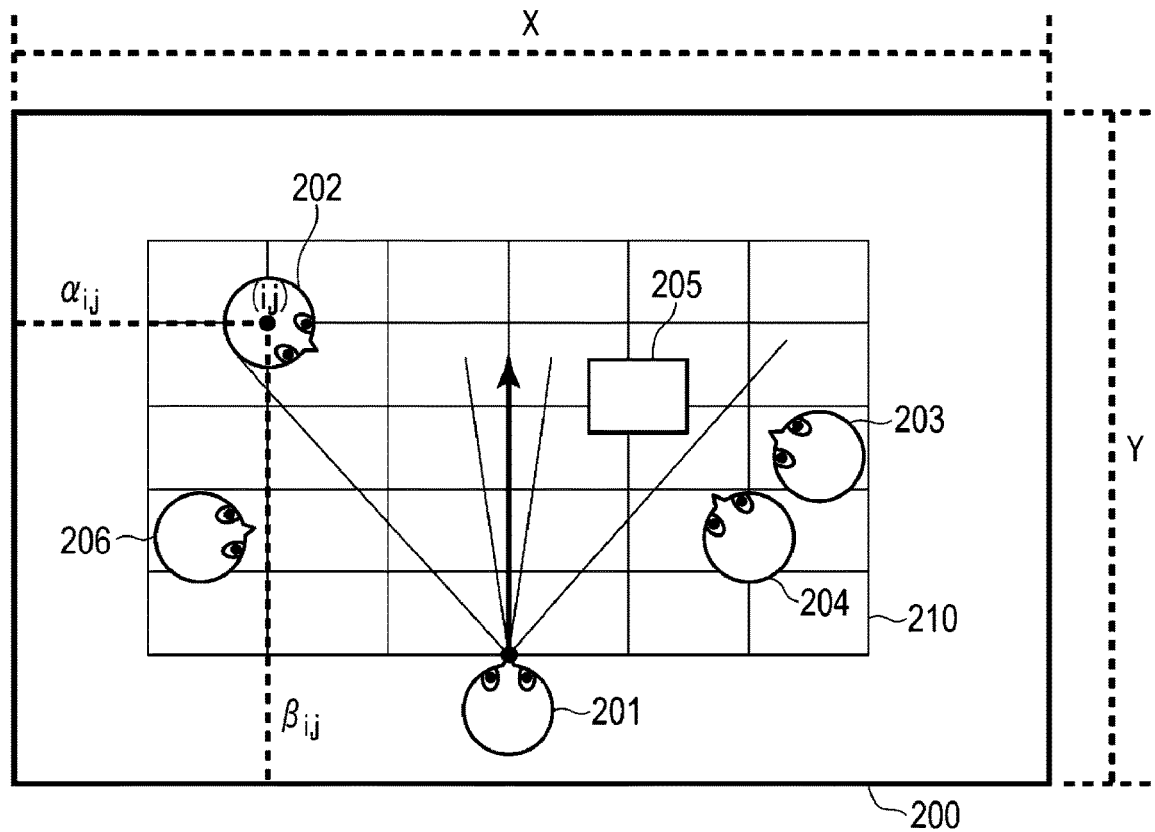
FIG. 5 is a diagram illustrating an operation example of the agent system according to the first embodiment.

FIG. 5 illustrates a virtual space 200 set by the virtual space control unit 313. The virtual space 200 is X in horizontal width by Y in height (depth). In FIG. 5, objects 204 to 206 are further placed.

The position calculation unit 312 sets an agent placement area 210 in which the agent 202 can be placed. That is, the position calculation unit 312 determines a position in the agent placement area as the position of the agent 202.

The agent placement area 210 is an area divided in an M×N grid pattern in which the avatar 201 is allocated at a center of a lower end. i and j are subscripts indicating coordinates of a grid point of the agent placement area 210 in a relative coordinate system in which the avatar 201 is allocated at a center. i indicates an x coordinate, and j indicates a y coordinate.

The position calculation unit 312 determines the position of the agent 202 based on an evaluation value $V_{i,j}$ of the grid point (an evaluation target position). Here, the position calculation unit 312 determines a grid point at which the evaluation values $V_{i,j}$ is maximized as the position of the agent. Further, when there are a plurality of grid points at which the evaluation values $V_{i,j}$ is maximized, the position calculation unit 312 selects one grid point from the plurality of grid points. For example, the position calculation unit 312 may select a grid point farther from an end of the virtual space 200. Further, the position calculation unit 312 may be set by the user as to which of left and right or upper and lower grid points is preferentially selected.

The evaluation value $V_{i,j}$ is calculated by the following equation.

[Math. 1]
$$V_{ij} = \begin{cases} 0 & (\alpha_{ij} \le 0 \text{ or } \alpha_{ij} \ge X \text{ or } \beta_{ij} \le 0 \text{ or } \beta_{ij} \ge Y) \\ w_1 f_1(l_{ij}) + w_2 f_2(\theta_{ij}) + w_3 f_3(b_{ij}) & (0 < \alpha_{ij} < X \text{ and } 0 < \beta_{ij} < Y) \end{cases} (V_{ij} \ge 0)$$

$\alpha_{i,j}$ is a distance between a grid point (i, j) and a left end of the virtual space 200. Further, $\beta_{i,j}$ is a distance between the grid point (i, j) and a lower end of the virtual space 200. That is, $V_{i,j}$ become 0 when the corresponding grid point is outside the virtual space 200. The position calculation unit 312 calculates $\alpha_{i,j}$ and $\beta_{i,j}$, as follows.

First, the position calculation unit 312 converts the grid point (i, j) into coordinates (I, J) in a coordinate system (a world coordinate system) representing the entire virtual space according to the following equation.

[Math. 2]
$$\begin{pmatrix} I \\ J \\ 1 \end{pmatrix} = \begin{pmatrix} \cos \phi & -\sin \phi & x_0 \\ \sin \phi & \cos \phi & y_0 \\ 0 & 0 & 1 \end{pmatrix} \begin{pmatrix} i \\ j \\ 1 \end{pmatrix}$$

I indicates an x coordinate in the world coordinate system, and J indicates a y coordinate in the world coordinate system. $x_0$ indicates an x coordinate of the avatar 201 in the world coordinate system. $y_0$ indicates a y coordinate of the avatar 201 in the world coordinate system. φ indicates a rotation angle of the relative coordinate system on the world coordinate system.

The position calculation unit 312 calculates di, j based on a coordinate I and an x coordinate at the left end of the virtual space 200. The position calculation unit 312 calculates $\beta_{i,j}$ based on a coordinate J and a y coordinate at the lower end of the virtual space 200.

Next, $l_{i,j}$, $\theta_{i,j}$ and $b_{i,j}$ will be described.

Figure 6:
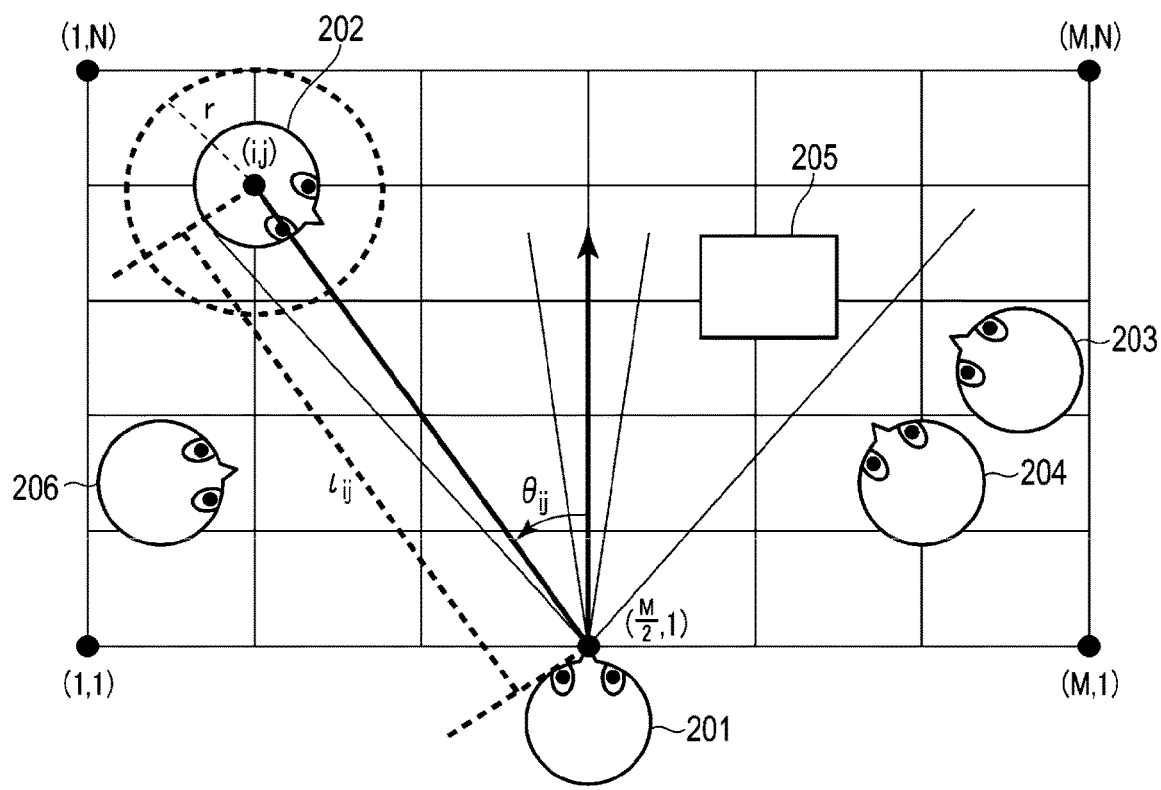
FIG. 6 is a diagram illustrating an operation example of the agent system according to the first embodiment.

FIG. 6 is a diagram illustrating $l_{i,j}$, $\theta_{i,j}$ and $b_{i,j}$. As illustrated in FIG. 6, $l_{i,j}$ indicate a distance between the grid point (i, j) and the avatar 201. Here, coordinates of the avatar 201 are a grid point (M/2, 1). That is, $l_{i,j}$ are a distance between the grid point (i, j) and the grid point (M/2, 1).

$\theta_{i,j}$ is an angle formed by a vector indicating a line-of-sight direction of the avatar 201 and a vector connecting the avatar 201 to the grid point (i, j). Here, the line-of-sight direction of the avatar 201 is the y-axis direction (an up direction).

$b_{i,j}$ is a density of objects in a range of a predetermined radius r from the grid point (i, j).

Further, $f_1$ is a function for calculating the evaluation value based on $l_{i,j}$. $f_2$ is a function for calculating the evaluation value based on $\theta_{i,j}$. $f_3$ is a function for calculating the evaluation value based on $b_{i,j}$.

Further, $W_1$, $W_2$, and $W_3$ are weighting coefficients of $f_1$, $f_2$, and $f_3$, respectively.

Next, $f_1$ will be described.

Figure 7:
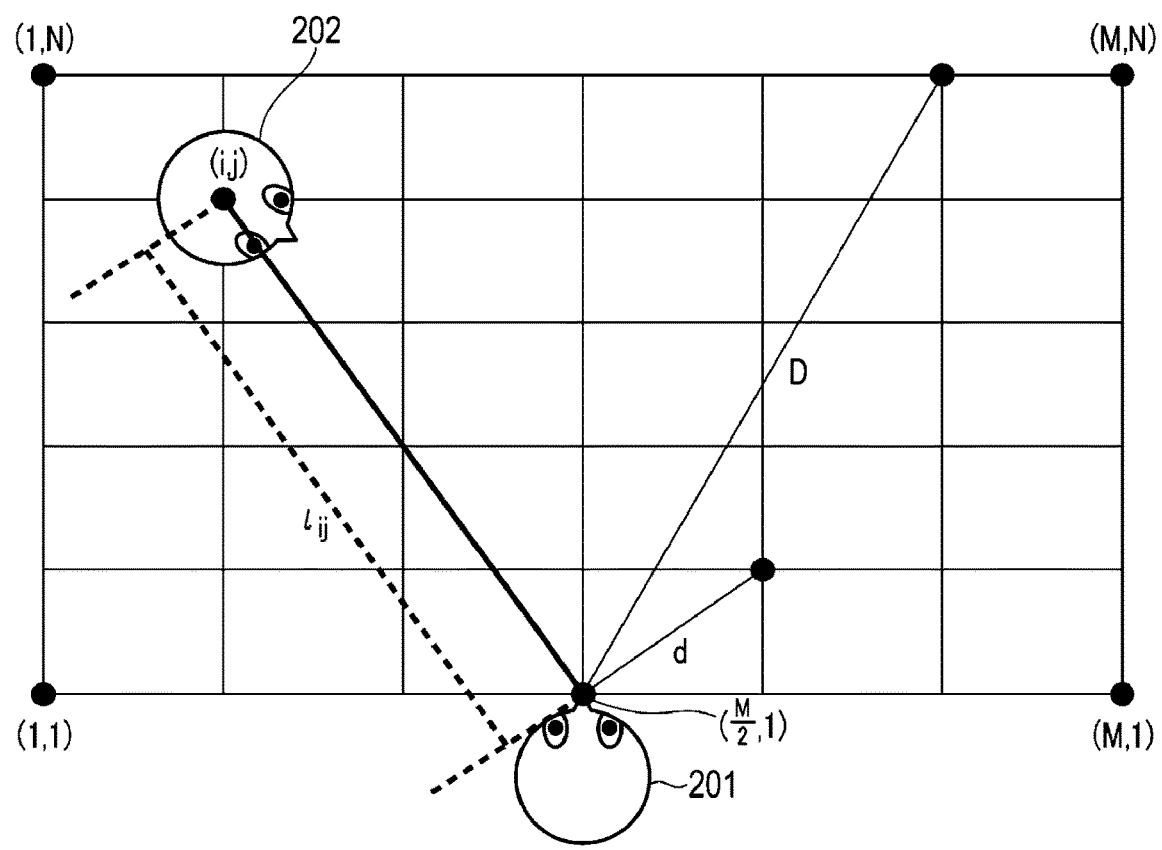
FIG. 7 is a diagram illustrating an operation example of the agent system according to the first embodiment.

FIG. 7 is a diagram illustrating $f_1$.

$f_1$ is a quadratic function maximized when a value at a center between a lower limit d and an upper limit D of $l_{i,j}$ is input. The lower limit d may be a lower limit of $l_{i,j}$ of the grid point in the field of view of the avatar 201. Further, the upper limit D may be an upper limit of $l_{i,j}$ of the grid point in the field of view of the avatar 201.

That is, $f_1$ is the following equation.

$$f_1(l_{ij}) = -\frac{1}{\left(\frac{d-D}{2}\right)^2}\left(l_{ij} - \frac{d+D}{2}\right)^2 + 1(d < l_{ij} \le D) \quad [\text{Math. 3}]$$

$f_1$ may be a function of a normal distribution maximized when the value at the center of the lower limit d and the upper limit D is input. A configuration of $f_1$ is not limited to a specific configuration.

Next, $f_2$ will be described.

Figure 8:
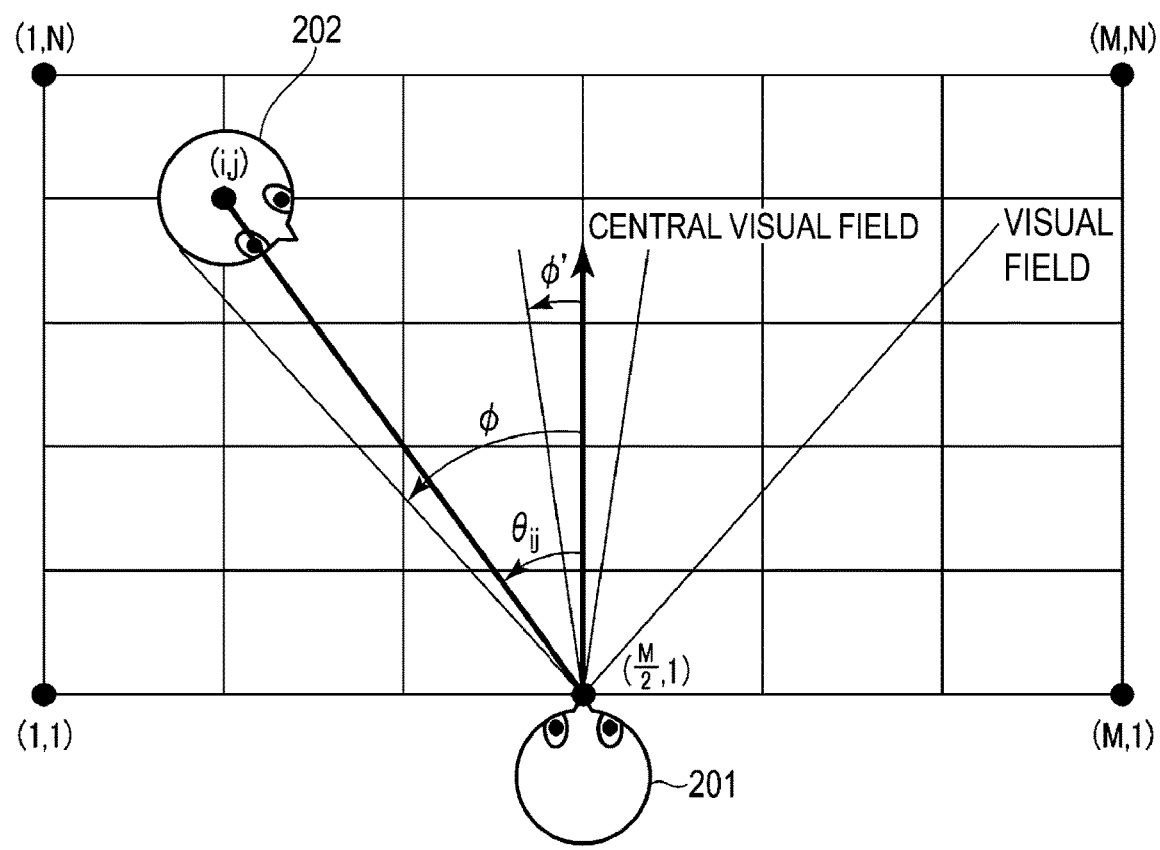
FIG. 8 is a diagram illustrating an operation example of the agent system according to the first embodiment.

FIG. 8 is a diagram illustrating $f_2$.

$f_2$ is a quadratic function maximized when a value at a center of $\varphi'$ and $\varphi$ is input.

As illustrated in FIG. 8, $\varphi'$ is an angle from a vector indicating the line of sight of the user to an end of a central visual field (an effective visual field). Further, $\varphi$ is an angle from the vector indicating the line of sight of the user to an end of the visual field.

That is, $f_2$ is the following equation.

$$f_2(\theta_{ij}) = -\frac{1}{\left(\frac{\phi - \phi'}{2}\right)^2}\left(\theta_{ij} - \frac{\phi' + \phi}{2}\right)^2 + 1\left(\phi' < \theta_{ij} \le \phi\right) \quad [\text{Math. 4}]$$

$f_2$ may be a function of a normal distribution maximized when the value at the center of $\varphi'$ and $\varphi$ is input.

Further, $f_2$ may be a function that increases in proportion to $\theta_{i,j}$ approaching q.

A configuration of $f_2$ is not limited to a specific configuration.

Next, $f_3$ will be described.

Figure 9:
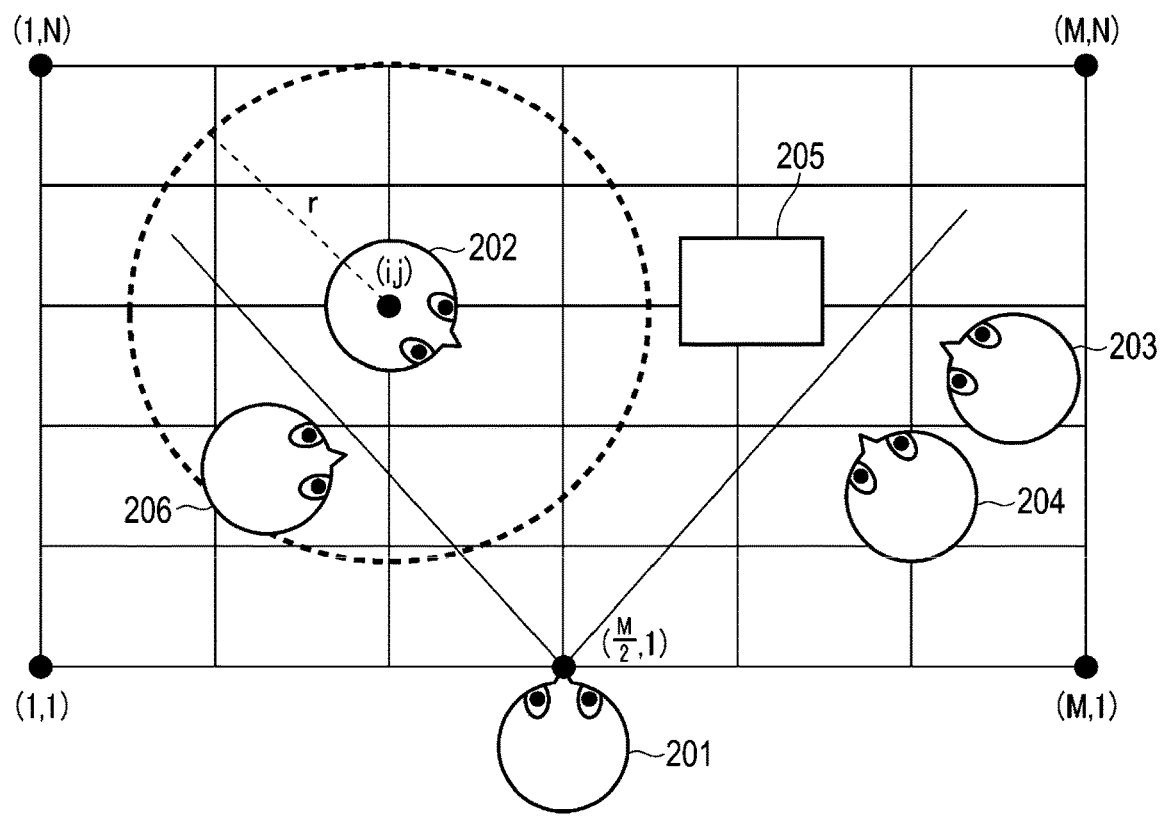
FIG. 9 is a diagram illustrating an operation example of the agent system according to the first embodiment.

FIG. 9 is a diagram illustrating $f_3$.

$f_3$ is a function that is inversely proportional to a density $b_{i,j}$ of the objects in the range of the radius r from the grid point (i, j).

$f_3$ is the following equation.

$$b_{ij} = \frac{a_{ij}}{2\pi r^2} \quad [\text{Math. 5}]$$

$$f_3(b_{ij}) = \begin{cases} 1(b_{ij} = 0) \\ \frac{1}{b_{ij}}(b_{ij} > 0) \end{cases}$$

$a_{i,j}$ is the number of objects in the range of the radius r from the grid point (i, j). In the example illustrated in FIG. 9, $a_{i,j}$ is 1.

$f_3$ may be a function that decreases in proportion to the density $b_{i,j}$ of the objects.

A configuration of $f_3$ is not limited to a specific configuration.

The position calculation unit 312 outputs agent position information indicating the determined position to the virtual space control unit 313.

Next, an operation example of the agent system 100 will be described.

Figure 10:
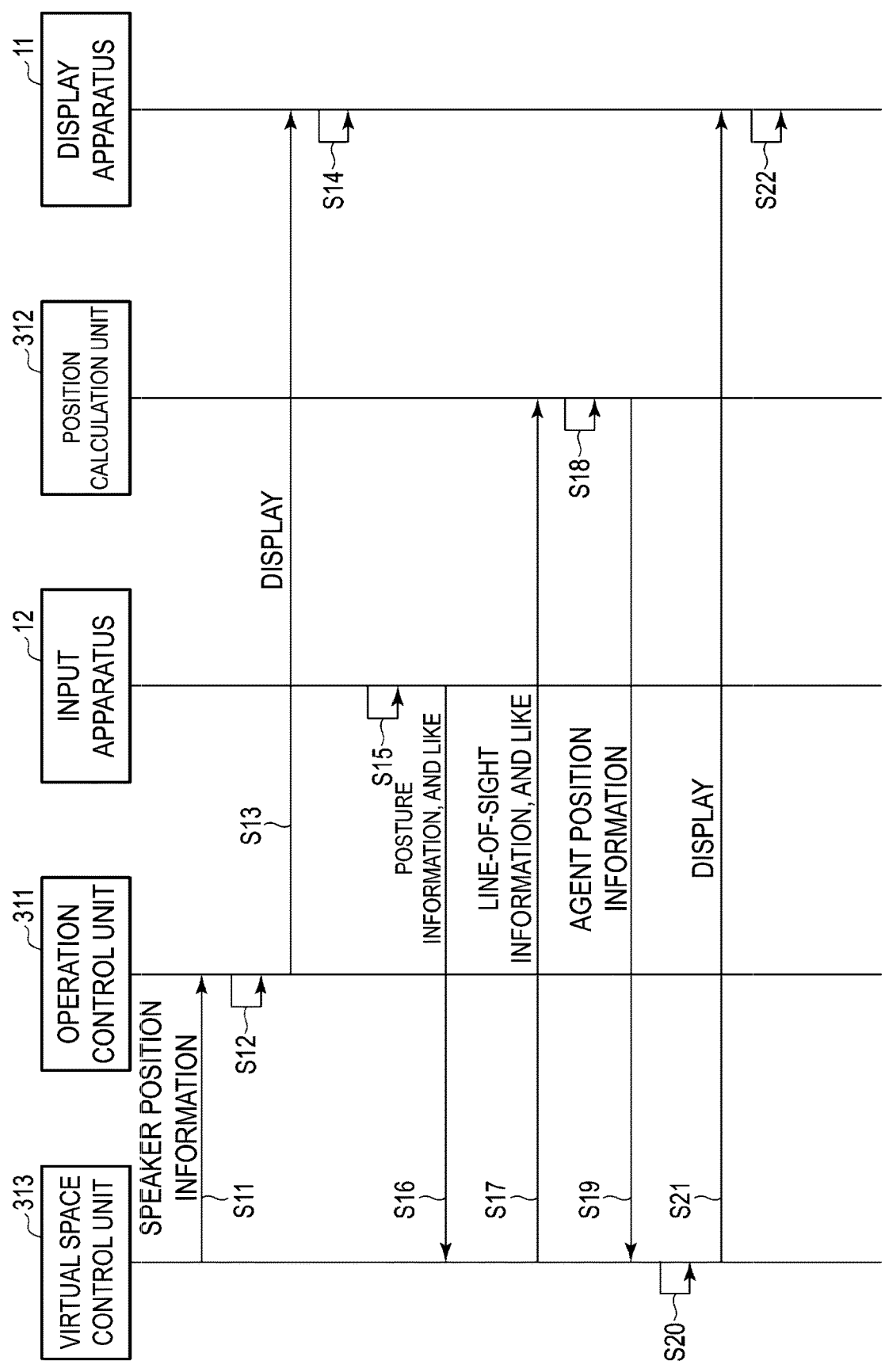
FIG. 10 is a sequence diagram illustrating an operation example of the agent system according to the first embodiment.

FIG. 10 is a sequence diagram illustrating the operation example of the agent system 100.

Here, it is assumed that the speaker intends to start communication with the avatar 201.

First, the virtual space control unit 313 outputs speaker position information indicating a position of the speaker to the operation control unit 311 (S11).

The operation control unit 311 changes the direction of the agent 202 based on the speaker position information from the virtual space control unit 313 (S12). When the direction of the agent 202 is changed, the operation control unit 311 performs control for causing the display apparatus 11 to display the image in which the direction of the agent 202 has been changed (S13).

The display apparatus 11 updates the display of the agent 202 according to the control of the operation control unit 311 (S14).

Here, the input apparatus 12 acquires the posture information of the user and the user position information (S15). When the posture information and the user position information are acquired, the input apparatus 12 inputs the acquired posture information and user position information to the information processing apparatus 3 (S16).

When the input apparatus 12 inputs the posture information and the user position information, the virtual space control unit 313 outputs line-of-sight information indicating the vector indicating the line-of-sight of the user, the position of the user, and the like, object information indicating objects installed in the virtual space 200, positions of the objects, and the like, grid point information indicating a grid point in the relative coordinate system, and the like to the position calculation unit 312 (S17).

The position calculation unit 312 determines the position of the agent 202 based on the information from the virtual space control unit 313 (S18). When the position of the agent 202 is determined, the position calculation unit 312 outputs agent position information indicating the position of the agent 202 to the virtual space control unit 313 (S19).

The virtual space control unit 313 changes the position of the agent 202 to the position indicated by the agent position information from the position calculation unit 312 (S20). When the position of the agent 202 is changed, the virtual space control unit 313 performs control for causing the display apparatus 11 to display an image in which the position of the agent 202 has been changed (S21).

The display apparatus 11 updates the display of the agent 202 according to the control of the operation control unit 311 (S22).

The agent system 100 may return to S11 or S15.

Further, the virtual space control unit 313 may execute S13 based on the information from the operation control unit 311.

The agent system configured as described above places an agent that supports the avatar of the user in the virtual space. The agent system places the agent at a position easily visible to the user while avoiding an area watched by the user based on the evaluation value of the grid point.

As a result, the agent system can reduce a trouble of the user searching for the agent by placing the agent in the field of view of the user. Further, the agent system can support the user without blocking the activity of the user by placing the agent while avoiding an area watched by the user.

Second Embodiment

Next, a second embodiment will be described.

An agent system according to the second embodiment differs from that according to the first embodiment in that an agent that supports a user is placed in a real space. Thus, other respects are denoted by the same reference numerals and detailed description thereof will be omitted. An agent according to the second embodiment is a robot or the like.

Figure 11:
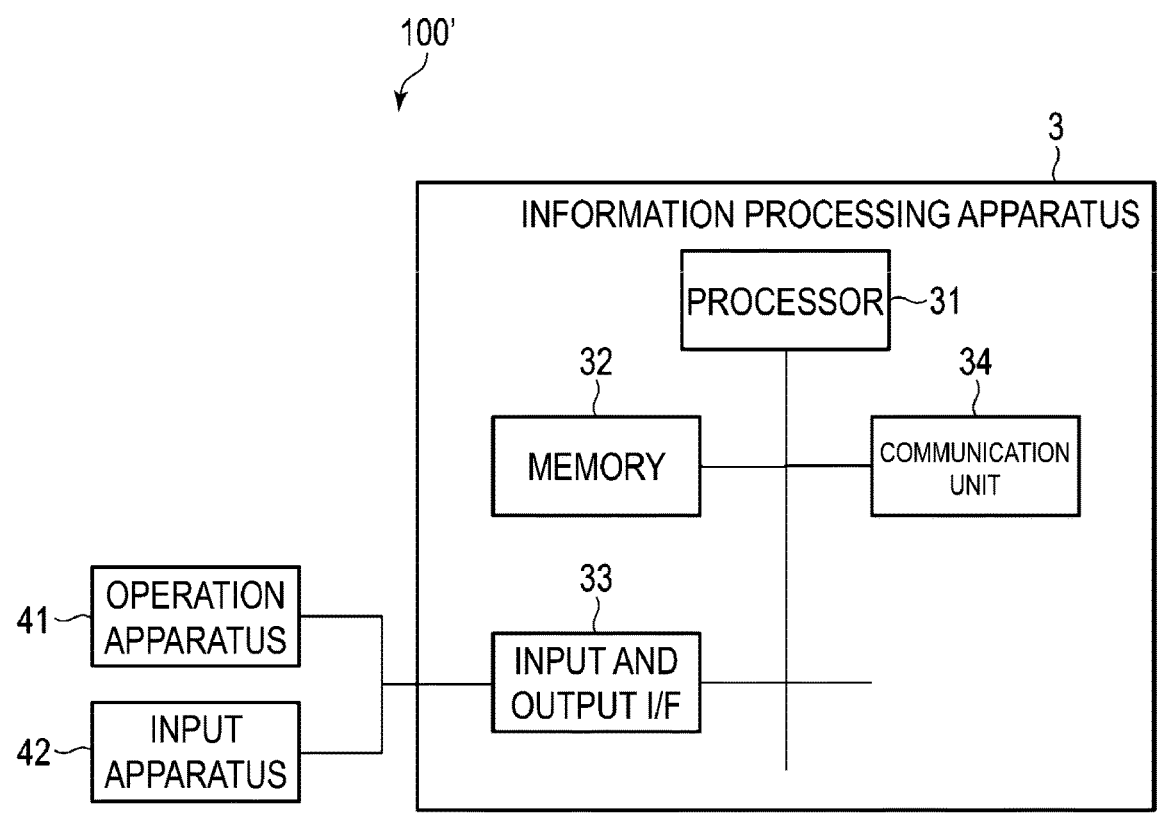
FIG. 11 is a block diagram illustrating a configuration example of an agent system according to a second embodiment.

FIG. 11 is a block diagram illustrating a configuration example of an agent system 100' according to the second embodiment. As illustrated in FIG. 11, the agent system 100' includes, for example, an information processing apparatus 3, an operation apparatus 41, and an input apparatus 42. The operation apparatus 41 and the input apparatus 42 are connected to the information processing apparatus 3.

The operation apparatus 41 controls the operation of the agent placed in the real space. The operation apparatus 41 moves the agent according to the control of the information processing apparatus 3. Further, the operation apparatus 41 changes the posture, direction, or the like of the agent according to the control of the information processing apparatus 3.

The input apparatus 42 detects the position, posture, and the like of the user. For example, the input apparatus 42 detects, for example, the movement of the head as the posture of the user. The input apparatus 42 inputs the posture information indicating the posture of the user and the user position information indicating the position of the user to the information processing apparatus 3.

Further, the input apparatus 42 may receive an input such as an operation of the user.

The agent system 100' may include a configuration as required, in addition to the configuration as illustrated in FIG. 11, or have a configuration in which a specific configuration is excluded from the information processing apparatus 3.

Next, functions that are realized by the information processing apparatus 3 will be described. The functions realized by the information processing apparatus 3 are realized by the processor 31 executing a program stored in the internal memory, the memory 32, or the like.

Figure 12:
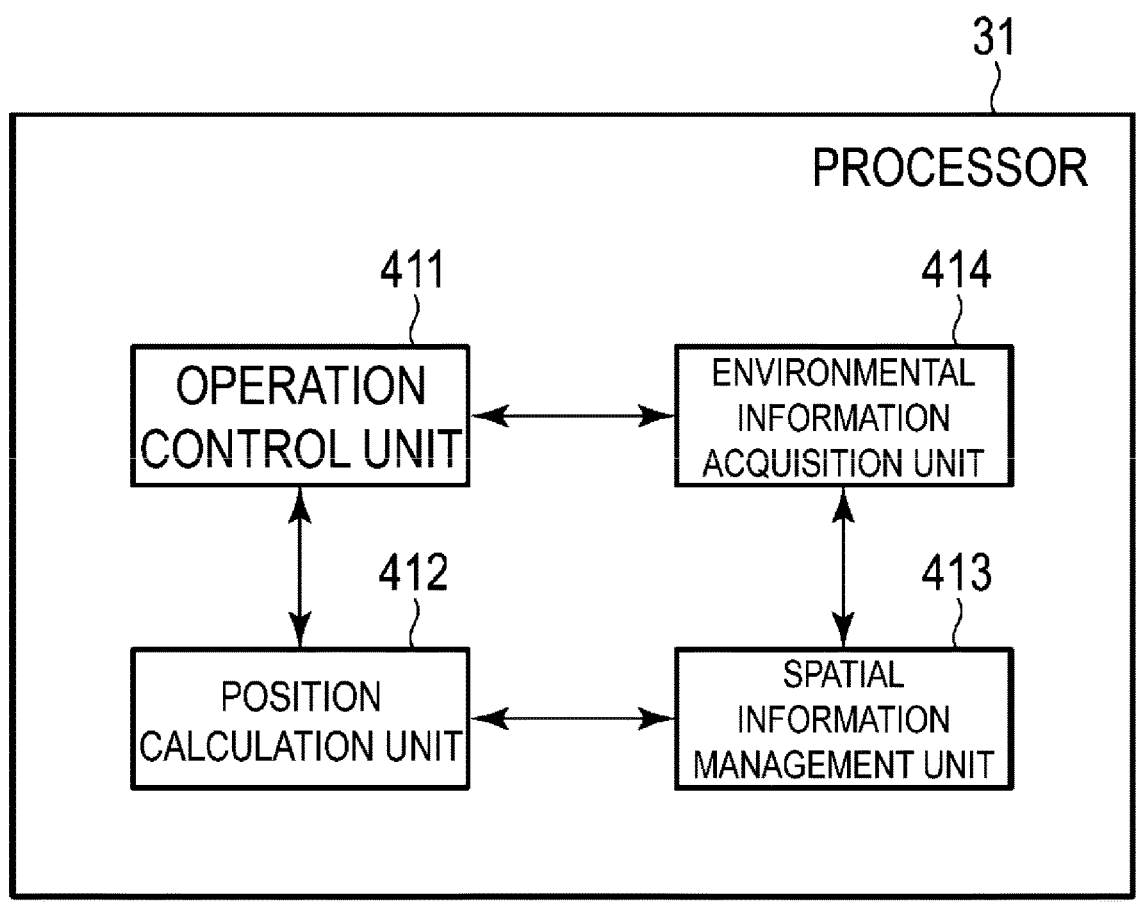
FIG. 12 is a functional block diagram of a processor according to the second embodiment.

FIG. 12 illustrates the functions that are realized by the processor 31. As illustrated in FIG. 12, the processor 31 realizes an operation control unit 411, a position calculation unit 412, a spatial information management unit 413, an environmental information acquisition unit 414, and the like.

The spatial information management unit 413 manages information in a predetermined real space in which the agent is operated. The spatial information management unit 413 has information such as the size of the space or the placement of objects in the space. Further, the spatial information management unit 413 manages the position of the speaker.

The environmental information acquisition unit 414 acquires information on surroundings in which the agent exists. Further, the environmental information acquisition unit 414 acquires the posture information and the user position information from the input apparatus. Further, the environmental information acquisition unit 414 acquires an intention of speaking of the speaker from the input apparatus.

The operation control unit 411 controls an operation of the agent through the operation apparatus 41. Here, the operation control unit 411 causes the agent to perform an operation of supporting the user through the operation apparatus 41. Because the support that the operation control unit 411 causes the agent to perform is the same as that in the first embodiment, description thereof will be omitted.

The position calculation unit 412 determines the position of the agent in the real space. Because an operation of the position calculation unit 412 is the same as that of the position calculation unit 312, description thereof will be omitted.

Next, an operation example of the agent system 100' will be described.

Figure 13:
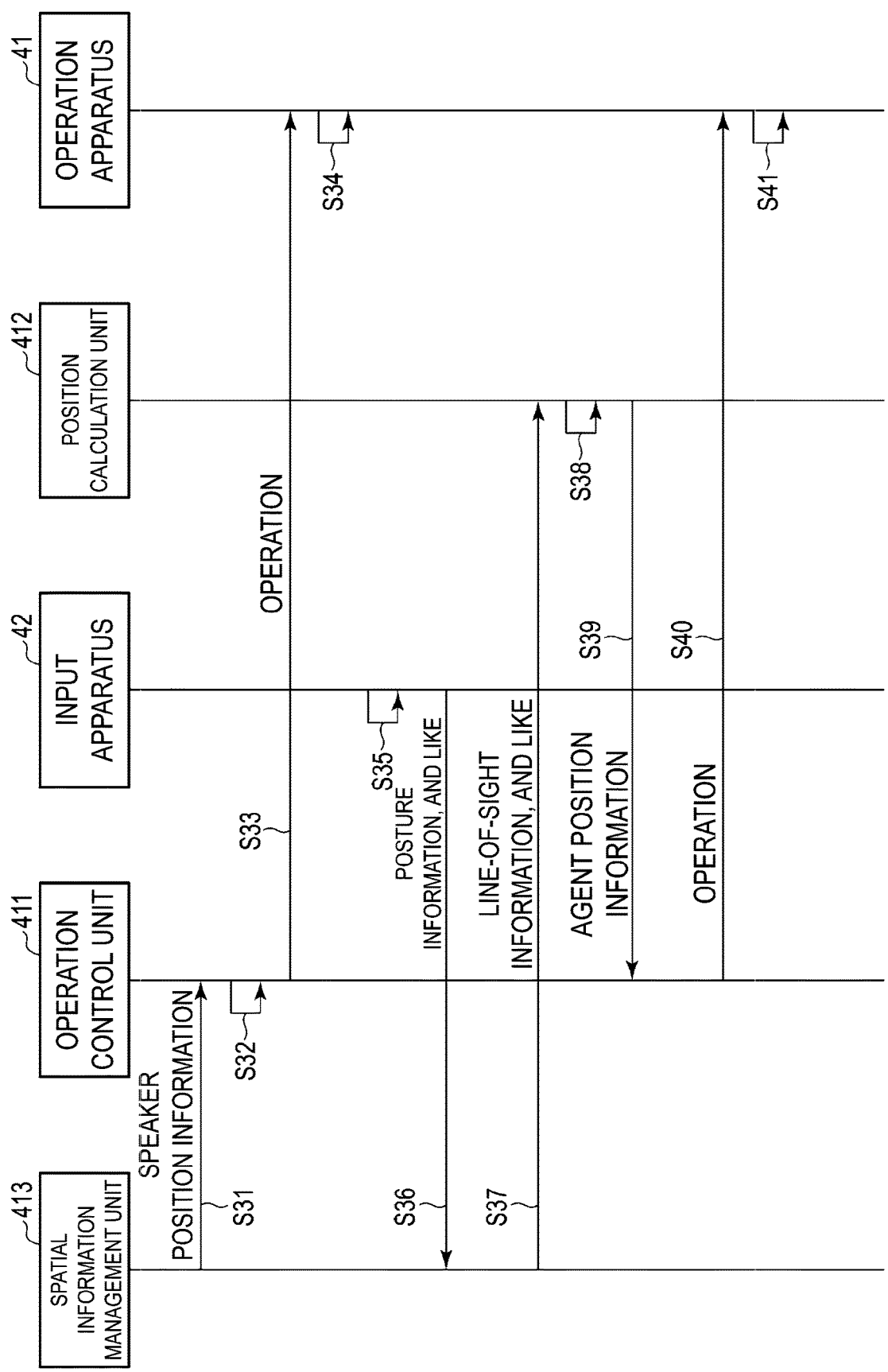
FIG. 13 is a sequence diagram illustrating an operation example of the agent system according to the second embodiment.

FIG. 13 is a sequence diagram illustrating an operation example of the agent system 100'.

Here, it is assumed that the speaker intends to start communication with the user.

First, the spatial information management unit 413 outputs the speaker position information indicating the position of the speaker to the operation control unit 411 (S31).

The operation control unit 411 calculates the angle p for rotating the agent based on the speaker position information from the spatial information management unit 413 (S32). When the angle p is calculated, the operation control unit 411 performs control for causing the operation apparatus 41 to rotate the agent by the angle p (S33).

The operation apparatus 41 rotates the agent according to the control from the operation control unit 411 (S34).

Here, the input apparatus 42 acquires the posture information of the user and the user position information (S35). When the input apparatus 42 acquires the posture information and the user position information, the input apparatus 42 inputs the acquired posture information and user position information to the information processing apparatus 3 (S36).

When the input apparatus 42 inputs the posture information and the user position information, the spatial information management unit 413 outputs line-of-sight information indicating the vector indicating the line-of-sight of the user, the position of the user, and the like, object information indicating objects installed in the space, positions of the objects, and the like, the grid point information indicating the grid point in the relative coordinate system, and the like to the position calculation unit 412 (S37).

The position calculation unit 412 determines the position of the agent based on the information from the spatial information management unit 413 (S38). When the position of the agent is determined, the position calculation unit 412 outputs the agent position information indicating the position of the agent to the operation control unit 411 (S39).

The operation control unit 411 performs control for causing the operation apparatus 41 to move the agent to the position indicated by the agent position information from the position calculation unit 312 (S40).

The operation apparatus 41 moves the agent according to the control from the operation control unit 411 (S41).

The agent system 100' may return to S31 or S35.

In the agent system configured as described above, it is possible to place the agent at a position easily visible to the user while avoiding an area watched by the user, like the agent system of the first embodiment, in the real space.

The present invention is not limited to the above embodiments, and can be variously modified at an implementation stage without departing from the gist thereof. For example, a type or configurations of the information processing apparatus, a type or configuration of display device, a procedure and content of information presentation position determination processing, a type or generation method of presented information, and the like can be modified and implemented in various ways without departing from the gist of the present invention.

Further, the embodiments may be implemented through appropriate selection or a combination as much as possible. Further, the embodiments include inventions at various stages, and various inventions can be extracted by an appropriate combination in a plurality of disclosed constituent requirements.

REFERENCE SIGNS LIST

1 Headset
3 Information processing apparatus
11 Display apparatus
12 Input apparatus
31 Processor
32 Memory
33 Input and output interface
34 Communication unit
41 Operation apparatus
42 Input apparatus
100 Agent system
100' Agent system
200 Virtual space
201 Avatar
202 Agent
203 Speaker
204 Object
205 Object
206 Object
210 Agent placement area
311 Operation control unit
312 Position calculation unit
313 Virtual space control unit
411 Operation control unit
412 Position calculation unit
413 Spatial information management unit
414 Environmental information acquisition unit

We claim:

1. An information processing apparatus comprising:
an interface configured to transmit or receive data to or from an input apparatus configured to input user position information indicating a position of a user; and
a processor configured to;
calculate an evaluation value for an evaluation target position based on the user position information, wherein the evaluation value is based on a function maximized at a value of a center between an angle of an end of a central visual field of the user and an angle of an end of a visual field of the user,
determine a position in a virtual space or a real space where an agent supporting the user is placed, based on the evaluation value, and
place the agent at the determined position in the virtual space or the real space.

2. The information processing apparatus according to claim 1, wherein the evaluation value is based on a distance between the position of the user and the evaluation target position.

3. The information processing apparatus according to claim 2, wherein the evaluation value is based on a function maximized at a center value between an upper limit and a lower limit of the distance.

4. The information processing apparatus according to claim 1, wherein
the input apparatus inputs posture information indicating a posture of the user,
the processor calculates a vector indicating a line of sight of the user based on the posture information, and
the evaluation value is based on an angle formed by a vector connecting the position of the user to the evaluation target position and the vector indicating the line of sight of the user.

5. The information processing apparatus according to claim 1, wherein the evaluation value is based on the number of objects at a predetermined distance from the evaluation target position.

6. An information processing method executed by a processor, the information processing method comprising:
acquiring user position information indicating a position of a user;
calculating an evaluation value for an evaluation target position based on the user position information, wherein the evaluation value is based on a function maximized at a value of a center between an angle of an end of a central visual field of the user and an angle of an end of a visual field of the user;
determining a position in a virtual space or a real space where an agent supporting the user is placed based on the evaluation value; and
placing the agent at the determined position in the virtual space or the real space.

7. A non-transitory computer-readable medium storing program instructions that cause a computer to perform operations comprising:
acquiring user position information indicating a position of a user;
calculating an evaluation value for an evaluation target position based on the user position information, wherein the evaluation value is based on a function maximized at a value of a center between an angle of an end of a central visual field of the user and an angle of an end of a visual field of the user;
determining a position in a virtual space or a real space where an agent supporting the user is placed based on the evaluation value; and
placing the agent at the determined position in the virtual space or the real space.

* * * * *